(12) United States Patent
Baba

(10) Patent No.: US 7,746,739 B2
(45) Date of Patent: Jun. 29, 2010

(54) WRITING POWER DETERMINING METHOD AND OPTICAL DISC APPARATUS

(75) Inventor: Nobuyuki Baba, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 773 days.

(21) Appl. No.: 11/404,850

(22) Filed: Apr. 17, 2006

(65) Prior Publication Data

US 2007/0019523 A1   Jan. 25, 2007

(30) Foreign Application Priority Data

Jul. 22, 2005   (JP) .............................. 2005-212669

(51) Int. Cl.
   *G11B 7/00*   (2006.01)
(52) U.S. Cl. .................................. 369/47.53
(58) Field of Classification Search .............. 369/47.53, 369/47.5, 53.26, 116
   See application file for complete search history.

(56) References Cited

U.S. PATENT DOCUMENTS

| | | | |
|---|---|---|---|
| 6,885,617 B2 * | 4/2005 | Fukumoto ................ | 369/47.53 |
| 7,046,600 B2 * | 5/2006 | Matsumoto ............... | 369/47.53 |
| 7,085,210 B2 * | 8/2006 | Ogawa ..................... | 369/47.53 |
| 7,095,691 B2 * | 8/2006 | Takeda .................... | 369/47.53 |
| 7,106,673 B2 * | 9/2006 | Takeda .................... | 369/47.53 |
| 7,113,468 B2 * | 9/2006 | Udagawa .................. | 369/59.11 |
| 2002/0196719 A1 * | 12/2002 | Morishima ............... | 369/47.53 |
| 2003/0035355 A1 * | 2/2003 | Morishima ............... | 369/47.53 |
| 2004/0136303 A1 * | 7/2004 | Watanabe et al. ......... | 369/53.36 |

FOREIGN PATENT DOCUMENTS

JP   2004-171768   6/2004

* cited by examiner

*Primary Examiner*—Thang V Tran
(74) *Attorney, Agent, or Firm*—Oblon, Spivak, McClelland, Maier & Neustadt, L.L.P.

(57) ABSTRACT

A recording power determining method comprises writing data consecutively into a plurality of test blocks of an optical disc while changing recording power in such a manner that the arrangement of recording power values is distributed over the arrangement of the test blocks, reproducing the information recorded in the test blocks written into consecutively, determining an asymmetry value for each of the recording power values on the basis of the information in each of the test blocks reproduced, determining an approximation characteristic of the asymmetry value for a recording power on the basis of the asymmetry value for each of the recording power values, and determining a recording power for realizing a specific target value of the asymmetry value from the obtained approximation characteristic.

4 Claims, 10 Drawing Sheets

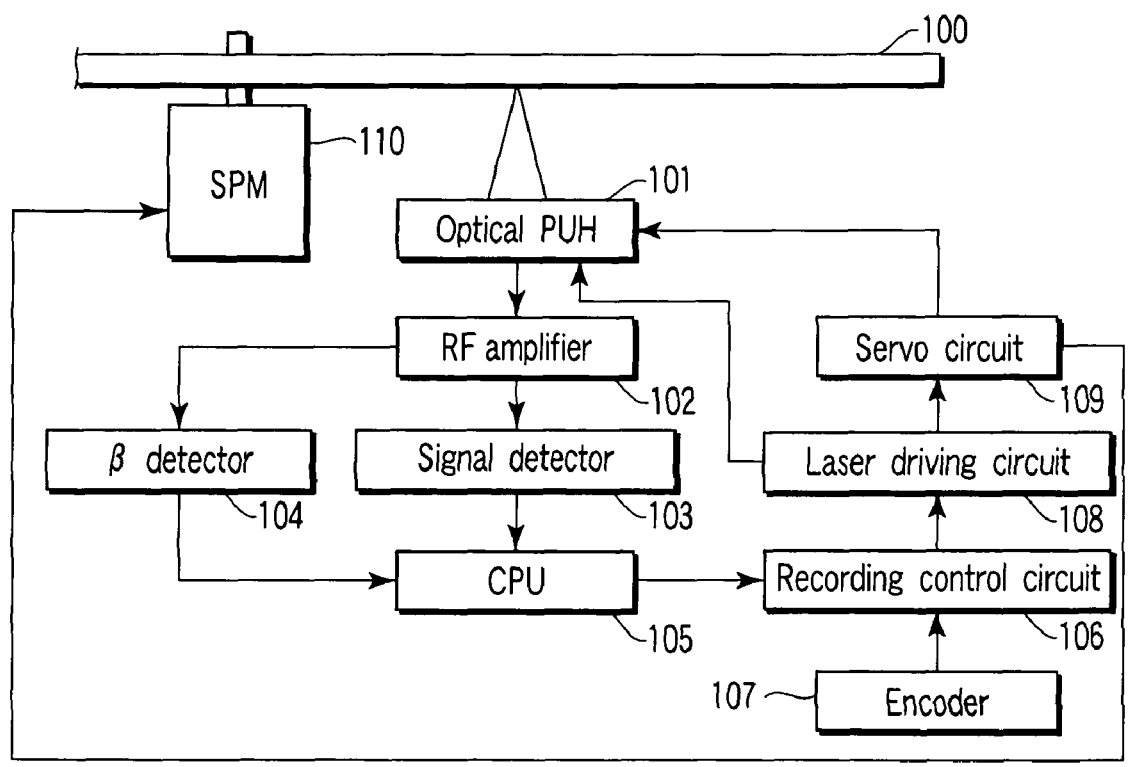
F I G. 1

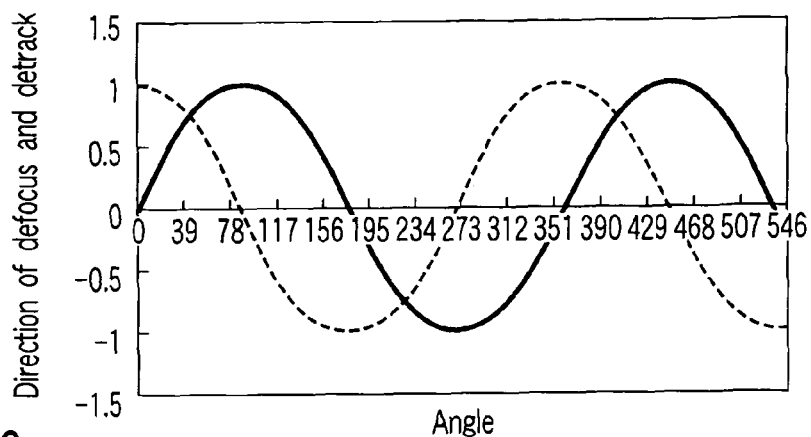
F I G. 10
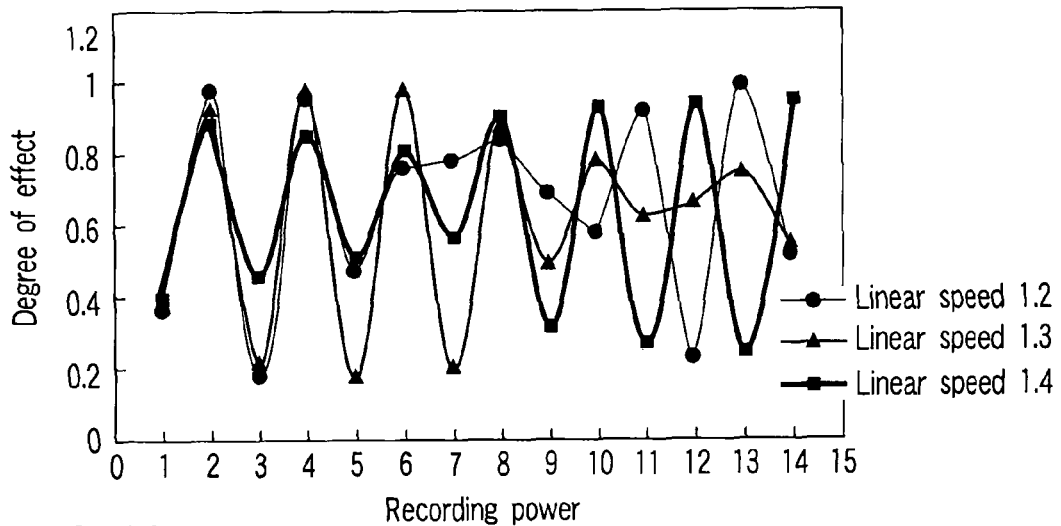
F I G. 11
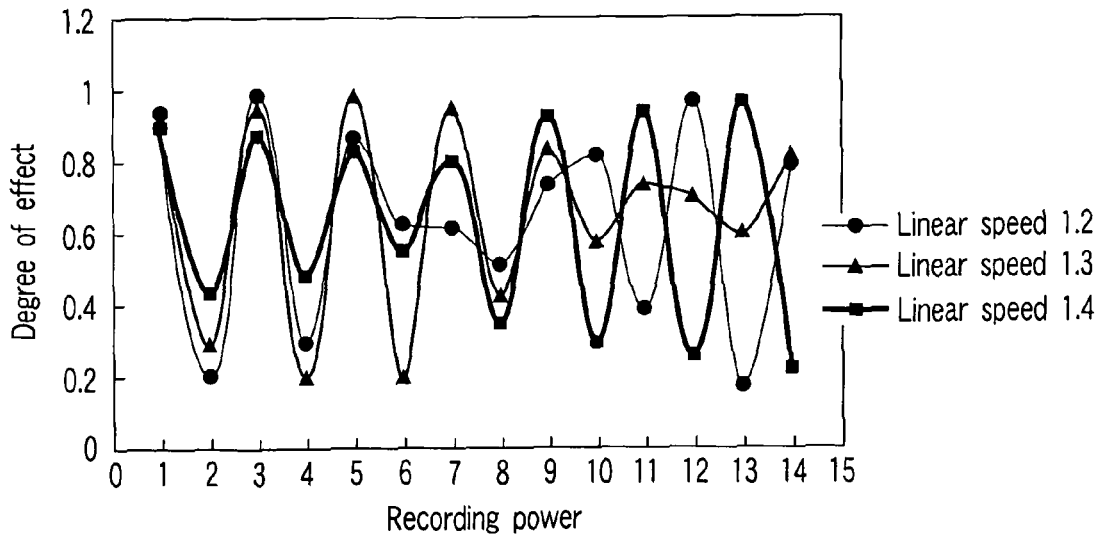
F I G. 12

WRITING POWER DETERMINING METHOD AND OPTICAL DISC APPARATUS

CROSS-REFERENCE TO RELATED APPLICATIONS

This application is based upon and claims the benefit of priority from prior Japanese Patent Application No. 2005-212669, filed Jul. 22, 2005, the entire contents of which are incorporated herein by reference.

BACKGROUND OF THE INVENTION

1. Field of the Invention

This invention relates to a recording power determining method of determining the optimum recording power even if an optical disc has a face deflection or an eccentricity and to an optical disc apparatus.

2. Description of the Related Art

When data is written onto an optical disc, such as CD-R or DVD-R, the optimum recording power is determined by doing test writing before final writing in order to write data with high quality.

To determine a recording power, test writing is done onto a test area set on an optical disc while changing the recording power of the laser beam sequentially. The test-written signal is reproduced, thereby measuring the asymmetry value (or signal quality).

If the optical disc has a face deflection or an eccentricity, the power of the laser beam applied to the recording tracks on the optical disc changes. Specifically, a drop in the recording power resulting from a focus shift caused by a face deflection or from a track shift due to an eccentricity makes it impossible to record the signal properly, which impairs the reliability of the determined recording power.

The technique for determining the recording power through eliminating the effects of a face deflection and an eccentricity has been disclosed in Jpn. Pat. Appln. KOKAI Publication No. 2004-171768.

In the prior art, test recording is done while changing the recording power sequentially around the disc. After the test recording, the test-recorded signal is reproduced, determining the asymmetry value in each recording power. From the measured value, a linear or quadratic approximation characteristic of the asymmetry value in the recording power is determined. From the determined linear or quadratic approximation characteristic, a recording power to realize a specific target of the asymmetry is found. To complete the test recording on just one round of the disc, the approximation characteristic is designed to be free from the face deflection or eccentricity components when the linear or quadratic approximation characteristic is determined from the measured result. Moreover, a light beam with unrecording power to do no recording is irradiated, thereby detecting the periodic fluctuation components of the reflected light beam due to a face deflection or eccentricity of the disc. The light beam with recording power is corrected so as to cancel the components.

However, for example, when a case where a position where the effect of a face deflection of the disc is large overlaps with a position where recording is done with the optimum power is compared with a case where a position where the effect of the face deflection is small overlaps with a position where recording is done with the optimum power, there appears a difference between the determined approximation characteristics, which causes the problem of impairing the reliability of test recording.

BRIEF SUMMARY OF THE INVENTION

According to an aspect of the present invention, there is provided a recording power determining method comprising: writing data consecutively into a plurality of test blocks of an optical disc while changing recording power in such a manner that the arrangement of recording power values is distributed over the arrangement of the test blocks; reproducing the information recorded in the test blocks written into consecutively; determining an asymmetry value for each of the recording power values on the basis of the information in each of the test blocks reproduced; determining an approximation characteristic of the asymmetry value for a recording power on the basis of the asymmetry value for each of the recording power values; and determining a recording power for realizing a specific target value of the asymmetry value from the obtained approximation characteristic.

According to another aspect of the present invention, there is provided a recording power determining method comprising: writing data into a plurality of test blocks arranged consecutively on an optical disc while changing a recording power in such a manner that the recording power values at which two test blocks were written into consecutively are caused to differ from one another by two places in the order in which all of the recording power values used in recording are arranged in ascending order; reproducing the information recorded in the test blocks written into consecutively; determining an asymmetry value for each of the recording power values on the basis of the information in each of the test blocks reproduced; determining an approximation characteristic of the asymmetry value for a recording power on the basis of the asymmetry value for each of the recording power values; and determining a recording power for realizing a specific target value of the asymmetry value from the obtained approximation characteristic.

BRIEF DESCRIPTION OF THE SEVERAL VIEWS OF THE DRAWING

FIG. 1 is a block diagram schematically showing the configuration of a recording and reproducing apparatus for an optical disc according to an embodiment of the present invention;

FIG. 10 shows the magnitude of defocus and detrack in one OPC in a recordable CD;

FIG. 11 shows the degree of the effect of a face deflection and eccentricity on the recording power when OPC is started in the order of recording power values shown in FIG. 5 from a position where the degree of the effect of a face deflection and eccentricity on the recordable CD is small;

FIG. 12 shows the degree of the effect of a face deflection and eccentricity on the recording power when OPC is started in the order of recording power values shown in FIG. 5 from a position where the degree of the effect of a face deflection and eccentricity on the recordable CD is large;

DETAILED DESCRIPTION OF THE INVENTION

Figure 2:
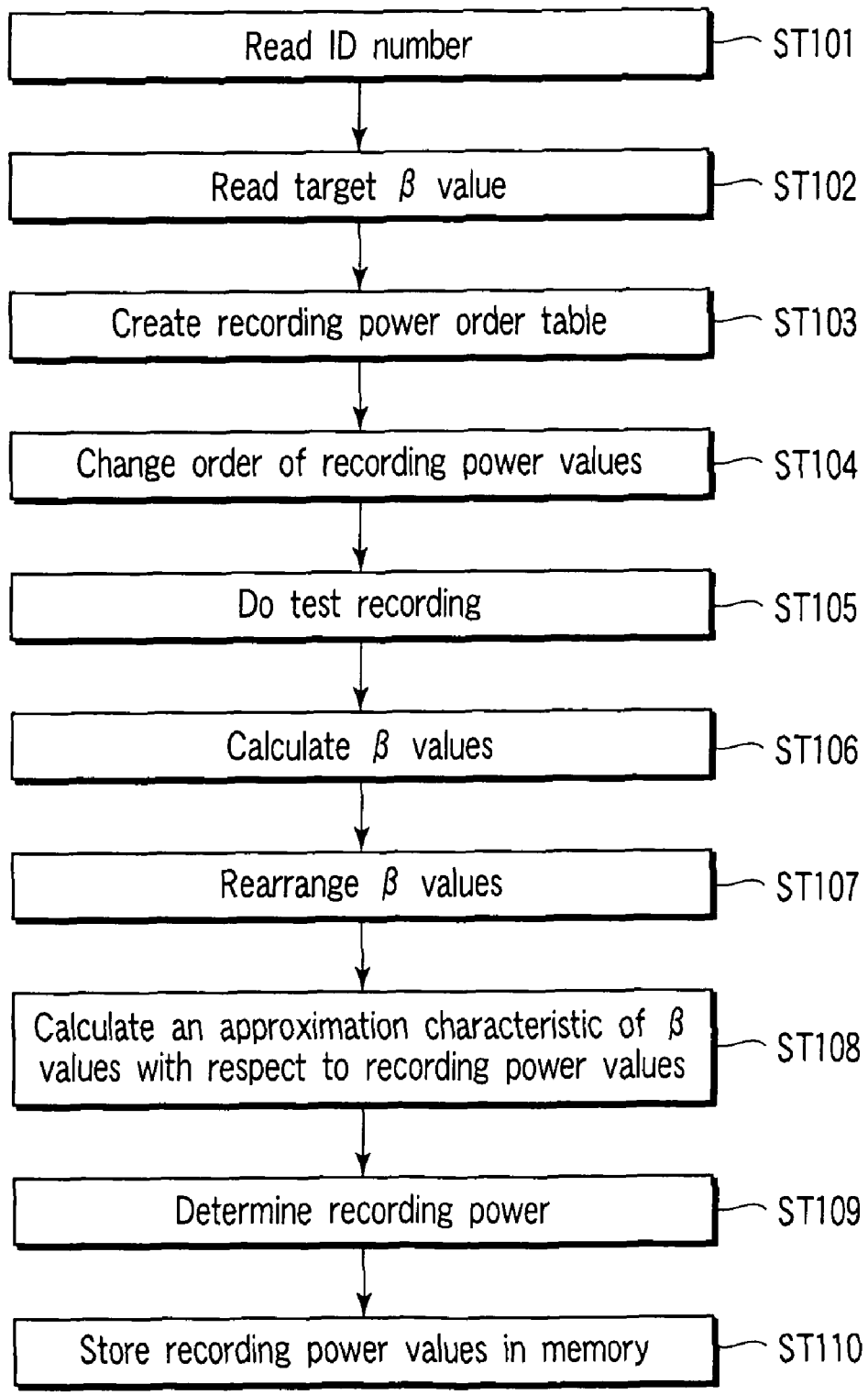
FIG. 2 is a flowchart to help explain an OPC (Optimum Power Calibration) operation in the embodiment.

Hereinafter, referring to the accompanying drawings, an embodiment of the present invention will be explained.

FIG. 1 is a block diagram schematically showing the configuration of a recording and reproducing apparatus for an optical disc according to an embodiment of the present invention.

The laser diode of an optical pickup head (PUH) 101 irradiates a laser beam onto an optical disc 100. The reflected light from the optical disc 100 is detected by a photodetector of the optical pickup head 101, which converts the light into an electric signal. The optical pickup head 101 is composed of a laser diode, an optical system including an objective, a focusing actuator, a tracking actuator, a photodetector, and a lens position sensor.

The output signal of the optical pickup head 101 is amplified by an RF amplifier 102. The signal amplified at the RF amplifier 102 is input to a signal detector 103 and a β detector 104. The signal detector 103 extracts the wobble component from the input signal. The signal detector 103 detects the address of the optical disc 100 on the basis of the extracted wobble component and supplies the detected address to a CPU 105. The CPU 105 recognizes the recording position in the radial direction of the optical disc 100 from the input address and outputs a control signal corresponding to the recording position to a recording control circuit 106. The β detector 104 detects the top peak value A and bottom peak value B of the RF signal and detects a β (asymmetry) value on the basis of the detected values.

An encoder 107 modulates the information to be written by a modulation scheme conforming to the format of the optical disc 100. For example, when the optical disc 100 is a recordable CD, such as CD-R or CD-RW, the encoder 107 subjects the information to eight fourteen modulation (EFM modulation) and outputs the modulated signal to the recording control circuit 106.

On the basis of the modulated signal and the control signal from the CPU 105, the recording control circuit 106 outputs a driving control signal to a servo circuit 109 and a laser driving circuit 108. The servo circuit 109 not only controls the rotation of a spindle motor 110 but also sets the focusing position and tracking position of the optical pickup head 101 suitably. The laser driving circuit 108 applies current to the laser diode of the optical pickup head 101 on the basis of the driving control signal, causing the laser diode to irradiate a laser beam onto the optical disc 100.

FIG. 2 is a flowchart to help explain an Optimum Power Calibration (OPC) operation in the embodiment.

The ID number recorded on the optical disc 100 is read (step ST101). The target β value corresponding to the ID number read in step ST101 and the recording speed is read from a table in which prepared internal memory (step ST102). The recording speed has been specified by a host computer or a system controller.

Figure 3:
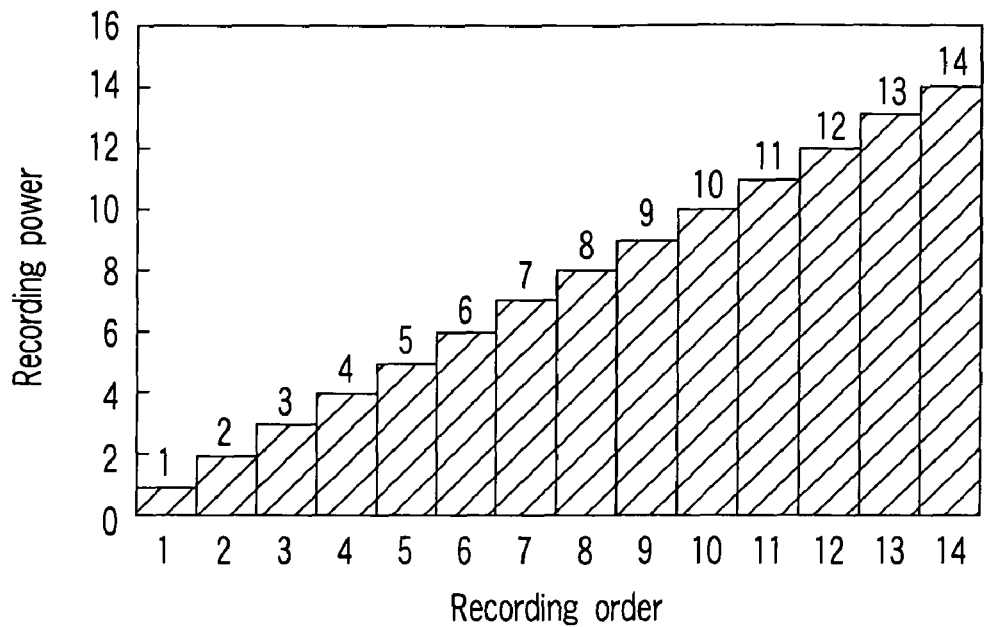
FIG. 3 is a diagram to help explain the order of recording power values created in step S103.

The start power and step power for OPC according to the recording speed are read. On the basis of the start power and step power, a table describing the order of recording power values as shown in FIG. 3 is created (step S103).

Figure 4:
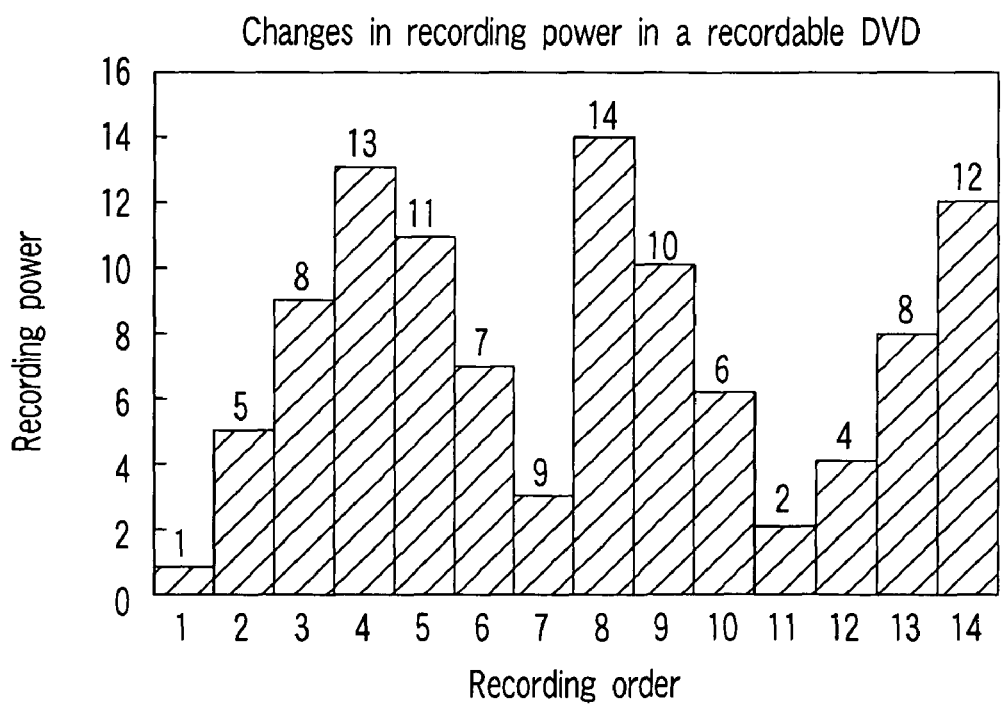
FIG. 4 is a diagram to help explain the order of recording power values created in step S104 (in the case of a recordable DVD)
Figure 5:
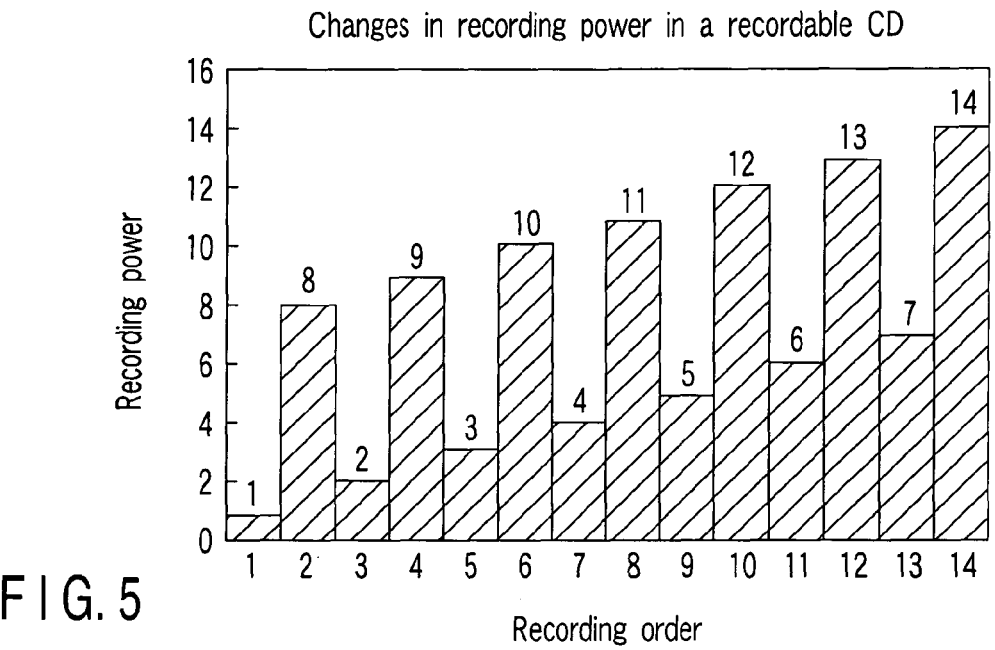
FIG. 5 is a diagram to help explain the order of recording power values created in step S104 (in the case of a recordable CD)

The recording power values are rearranged according to the recording order, thereby creating a new table (step ST104). For example, when the optical disc 100 is a recordable Digital Versatile Disc (DVD), the recording power values are rearranged as shown in FIG. 4. Moreover, when the optical disc 100 is a recordable Compact Disc (CD), the recording power values are rearranged as shown in FIG. 5.

Using the recording power values in the table obtained by rearranging the recording power values in step ST104, test recording is done in a Power Control Area (PCA) (step ST105).

The signal recorded in the PCA of the optical disc 100 is reproduced and β (asymmetry) values are calculated on a recording power basis (step ST106).

Hereinafter, the calculation of β values will be explained. An RF signal corresponding to the reflected light from the optical disc 100 which received light with the optical pickup head 101 is input to the RF amplifier 102. The RF amplifier 102 amplifies the input RF signal. The amplified RF signal is input to the β detector 104. The β detector 104 detects the top peak value A and bottom peak value B of the RF signal input on a recording power basis. The β detector 104 calculates a β (asymmetry) value from the detected two peaks. The β value is determined by substituting the top peak value A and bottom peak value B into the following equation:

$$\beta=(A+B)/(A-B)$$

Figure 6A:
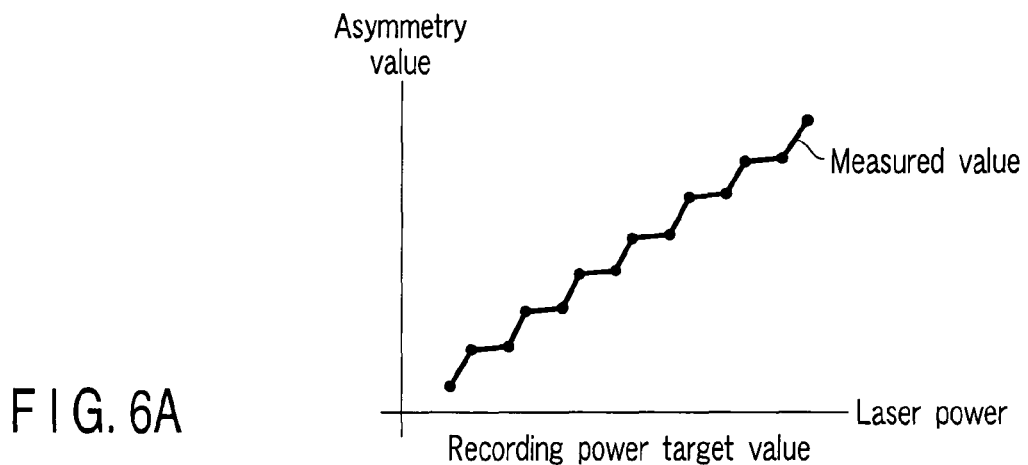
FIGS. 6A and 6B are characteristic diagrams of β values with respect to recording power values.
Figure 6B:
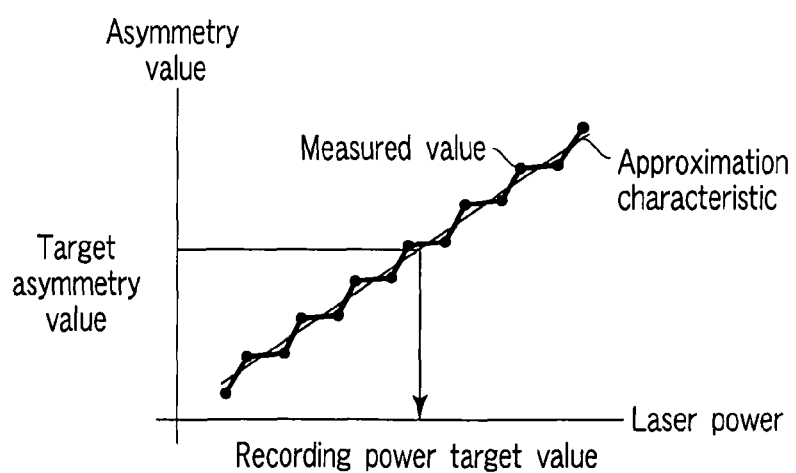

The β values determined on a recording power basis are rearranged with respect to the recording power values so as to provide a β value versus recording power characteristic diagram as shown in FIG. 6A (step ST107). The obtained β values are subjected to a smoothing process using a weighted average (the center value=½, the preceding and following values=¼), thereby obtaining an approximation characteristic of β values with respect to recording power values as shown in FIG. 6B (step ST108). As shown in FIG. 6B, the intersection of the target β value obtained in step ST102 and the approximation characteristic obtained in step ST108 is calculated, thereby determining the optimum recording power (step ST109). The determined optimum recording power is stored in a memory (step ST110).

Next, when data is actually written onto the optical disc 100, the data is written at the optimum recording power stored in the memory.

The operation of finding the β value will be explained in detail.

In the prior art, the recording power was changed stepwise as shown in FIG. 3 and the results were recorded. In the embodiment, the order of recording power values is distributed with respect to the order of recording positions as shown in FIG. 4 in the case of the recordable DVD and as shown in FIG. 5 in the case of the recordable CD. Since the number of tracks subjected to one power calibration in the recordable DVD differs from that in the recordable CD, the order of recording power values in the recordable DVD differs from that in the recordable CD. Specifically, the order of recording power values in the recordable DVD is determined, taking into account that about one track (equivalent to one round) is used to make a power calibration once. The order of recording power values in the recordable CD is determined, taking into account that about 1.5 to 1.7 rounds are used to make a power calibration once. Since in the case of the recordable CD, the linear speed in recording differs in the range of 1.2 to 1.4 m/s according to the memory capacity, the number of tracks used in power calibration differs.

The order of recording power values shown in FIGS. 4 and 5 is determined, taking the following points into account:

1. To prevent similar recording values from being affected by a face deflection or an eccentricity (in other words, to distribute the affected recording power values), recording is not done using similar recording power values in positions fulfilling the symmetry of a circle.

2. As for recording power values with which recording is done in positions where the effect of a face deflection or an eccentricity is large, recording is done in positions where the effect of a face deflection or an eccentricity is small using the preceding or succeeding recording power values.

In this way, the effect of a face deflection or an eccentricity exerted in smoothing by a weighted average can be cancelled when the optimum recording power is obtained from an asymmetry versus recording power characteristic.

To satisfy the above two conditions, for example, the order of recording power values is set so that the recording power values of adjacent blocks may be separated 2 steps or more from each other.

Figure 7:
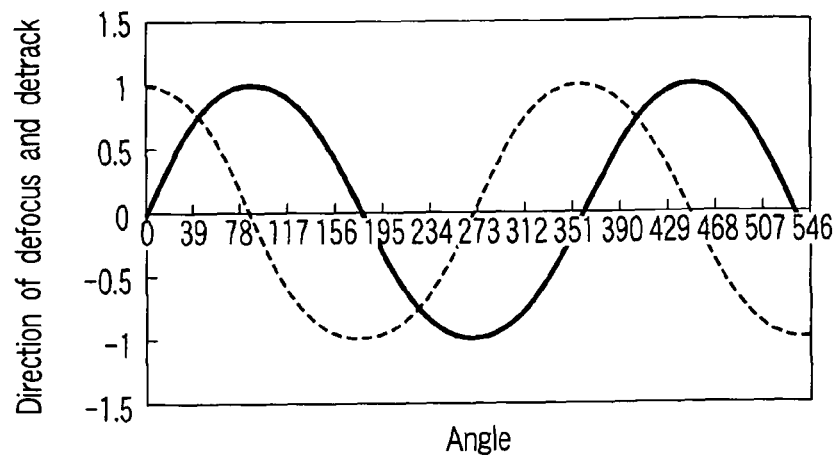
FIG. 7 shows the magnitude of defocus and detrack in a recordable DVD.

FIG. 7 shows the magnitude of defocus (a shift in the focus) and detrack (a shift in the radial direction) in one OPC of a recordable DVD. The solid line represents a case where recording was started from a position where defocus and detrack were small. The broken line represents a case where recording was started from a position where defocus and detrack were large.

Figure 8:
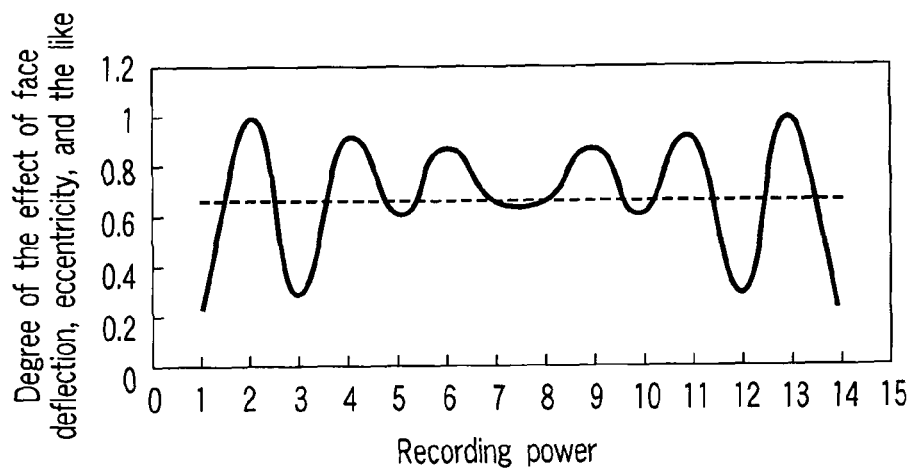
FIG. 8 shows the degree of the effect of a face deflection and eccentricity on the recording power when OPC is started in the order of recording power values shown in FIG. 4 from a position where the degree of the effect of a face deflection and eccentricity on the recordable DVD is small.

FIG. 8 shows the degree of the effect of a face deflection and eccentricity with respect to recording power values when OPC is started in the order of recording power values in the embodiment shown in FIG. 4 from a position where the degree of the effect of a face deflection and eccentricity on the recordable DVD is small. The solid line represents the degree of the effect with respect to recording power values. The broken line represents the result of linear approximation of the solid line.

Figure 9:
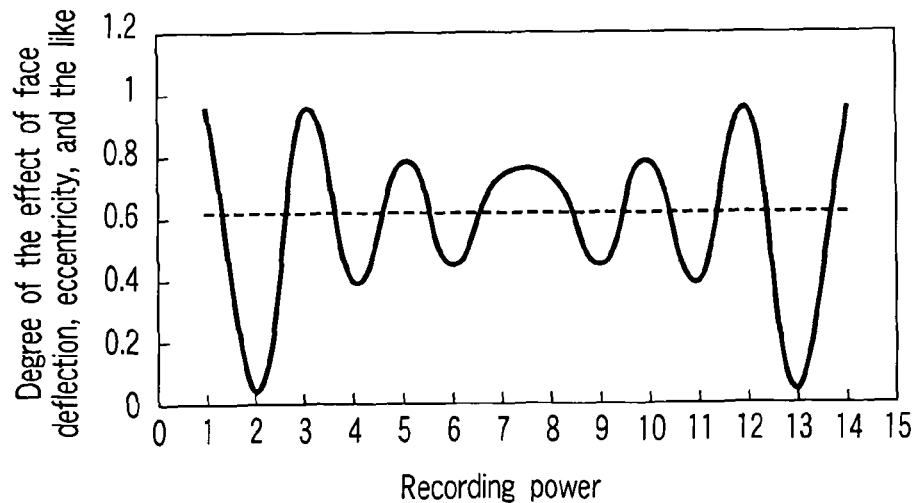
FIG. 9 shows the degree of the effect of a face deflection and eccentricity on the recording power when OPC is started in the order of recording power values shown in FIG. 4 from a position where the degree of the effect of a face deflection and eccentricity on the recordable DVD is large.

Similarly, FIG. 9 shows the degree of the effect of a face deflection and eccentricity with respect to recording power values when OPC is started in the order of recording power values shown in FIG. 4 as in FIG. 8 from a position where the degree of the effect of a face deflection and eccentricity on the recordable DVD is large. The solid line represents the degree of the effect with respect to recording power values. The broken line represents the result of linear approximation of the solid line.

As described above, in a case where recording is done on a disc with a face deflection or an eccentricity, even if the recording start position is where the degree of the effect of a face deflection or an eccentricity is large or small, the effect is cancelled in the calculated approximation characteristic. Therefore, the approximation characteristic does not depend on the recording start position.

FIG. 10 shows the magnitude of defocus (a shift in the focus) and detrack (a shift in the radial direction) in one OPC of a recordable CD. The solid line represents a case where recording was started from a position where defocus and detrack were small. The broken line represents a case where recording was started from a position where defocus and detrack were large. In the case of the recordable CD, the number of tracks used in OPC differs according to the linear speed (capacity). FIG. 10 shows a case where the recoding CD has a linear speed of 1.3 m/s. Since defocus or detrack occurs in either the plus direction or the minus direction, the asymmetry value goes in a direction in which it becomes smaller with respect to recording power values.

FIG. 11 shows the degree of the effect of a face deflection and eccentricity with respect to recording power values when OPC is started in the order of recording power values in the embodiment shown in FIG. 5 from a position where the degree of the effect of a face deflection and eccentricity on the recordable CD is small. In FIG. 11, the result for a linear speed of 1.2 m/s, that for a linear speed of 1.3 m/s, and that for a linear speed of 1.4 m/s are shown, taking into account that the linear speed of the recordable CD is not constant.

Similarly, FIG. 12 shows the degree of the effect of a face deflection and eccentricity with respect to recording power values when OPC is started in the order of recording power values shown in FIG. 5 from a position where the degree of the effect of a face deflection and eccentricity on the recordable CD is large. As in FIG. 11, the results for three linear speeds are shown.

As in the recordable DVD, in the recordable CD, adjacent recording power values differ from one another in the degree of the effect of a face deflection or an eccentricity. This acts so as to cancel the effect of a face deflection or an eccentricity in the calculated approximation characteristic of the asymmetry value. Moreover, even in a recording start position where the degree of the effect of a face deflection or an eccentricity is large or small, an approximation characteristic unaffected by the degree of the effect can be obtained.

Figure 13A:
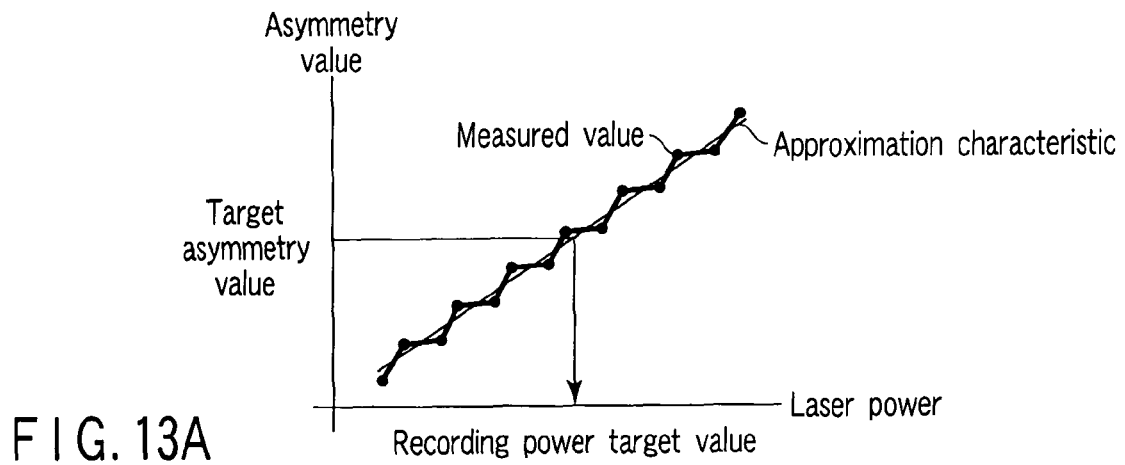
FIGS. 13A and 13B are characteristic diagrams of β values with respect to recording power values when OPC is made in the order of recording power values shown in FIG. 4 and FIG. 5, respectively.
Figure 13B:
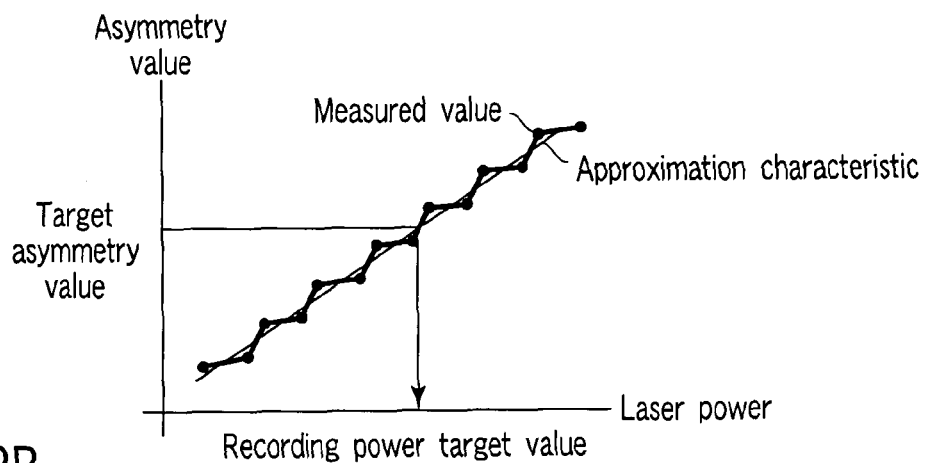

In a disc where the β value changes linearly with respect to the recording power, an approximation characteristic of the β value with respect to the recording power is calculated. The results of the calculations are shown in FIGS. 13A and 13B. FIGS. 13A and 13B show approximation characteristics of the β value with respect to the recording power when OPC is made in the order of recording power values shown in FIGS. 4 and 5 in a case where the test writing start point is in a position where the degree of the effect of a face deflection or an eccentricity is large and in a case where the degree of the effect is small, respectively. The approximation characteristics were calculated using the weighted average or linear approximation. When the asymmetry changes linearly with respect to the recording power, it has been shown that, even if the recording start position shifts 90° because of the effect of a face deflection or an eccentricity, using the weighted average or linear approximation produces a similar effect.

Figure 14:
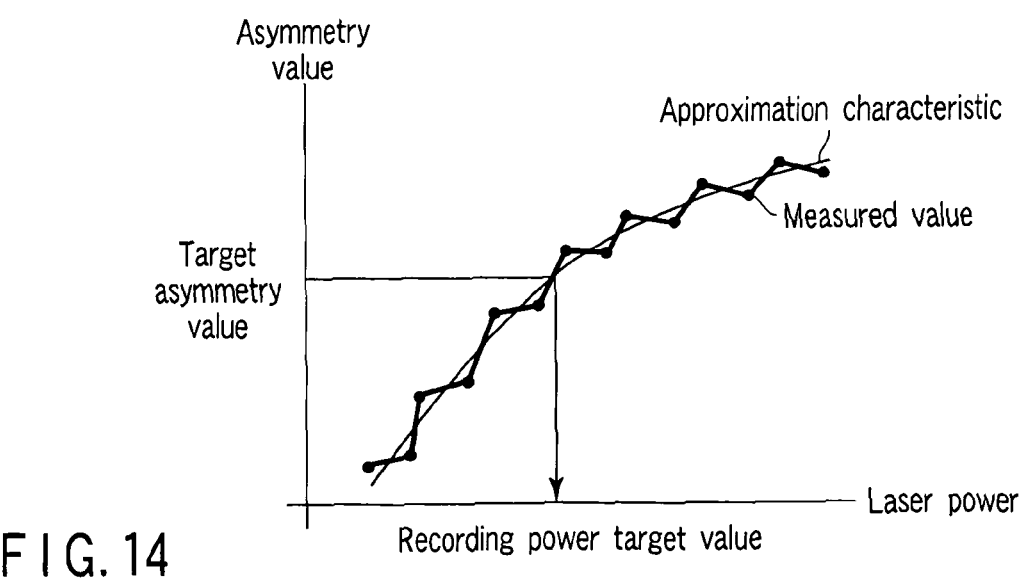
FIG. 14 shows an approximation characteristic of β values with respect to recording power values when OPC is made in the order of recording power values shown in FIG. 4 and FIG. 5.

Next, in a disc where the β value changes in a curve with respect to the recording power, an approximation characteristic of the β value with respect to the recording power is calculated. The results of the calculations are shown in FIG. 14. The approximation characteristic was calculated using the weighted average. FIG. 14 shows an approximation characteristic of the β value with respect to the recording power when OPC was made in the order of recording power values shown in FIGS. 4 and 5. When the β value changes in a curve with respect to the recording power, the measured value is averaged with weight, which makes it possible to eliminate the effect of a face deflection or an eccentricity in the asymmetry curve according to the characteristic of the disc as described above.

Figure 15:
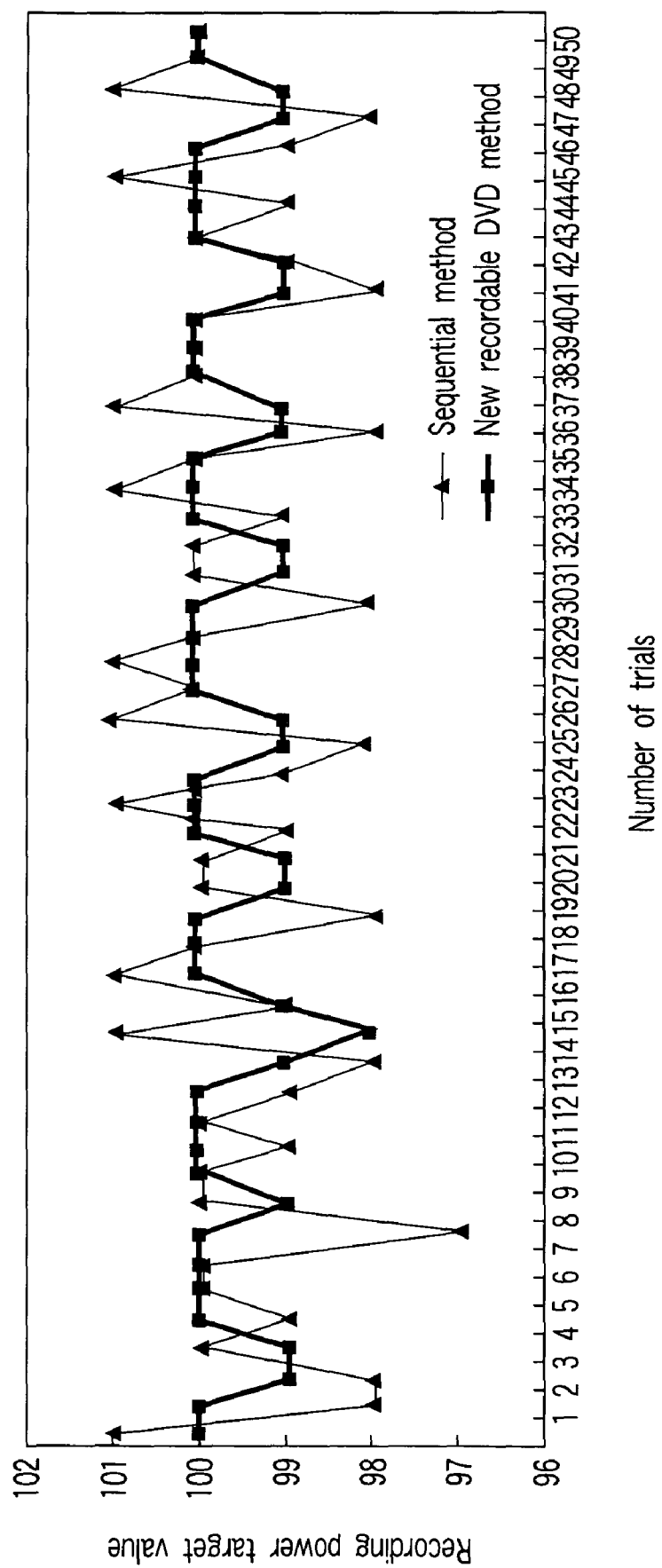
FIG. 15 is a diagram to help explain the result of examining the repeat accuracy of recording power target values obtained from a recording power versus β value approximation characteristic when OPC is made on a recordable DVD in a conventional order and in a new order.

FIG. 15 shows the result of examining the repeat accuracy of recording power target values obtained from a recording power versus β value approximation characteristic when OPC was made on a recordable DVD with a face deflection (or disc whose outermost edge deflected about 0.5 mm) in a conventional order (FIG. 3) and in a new order (FIG. 4).

Table 1 lists the resulting statistics shown in FIG. 15.

TABLE 1

|  | Conventional Order | New Order |
|---|---|---|
| Standard Deviation σ | 1.070762 | 0.530306034 |
| Average | 99.58 | 99.62 |
| Error | 1.075278 | 0.532328884 |

As shown in Table 1, the statistics in the new order shows better values than those in the conventional order.

Figure 16:
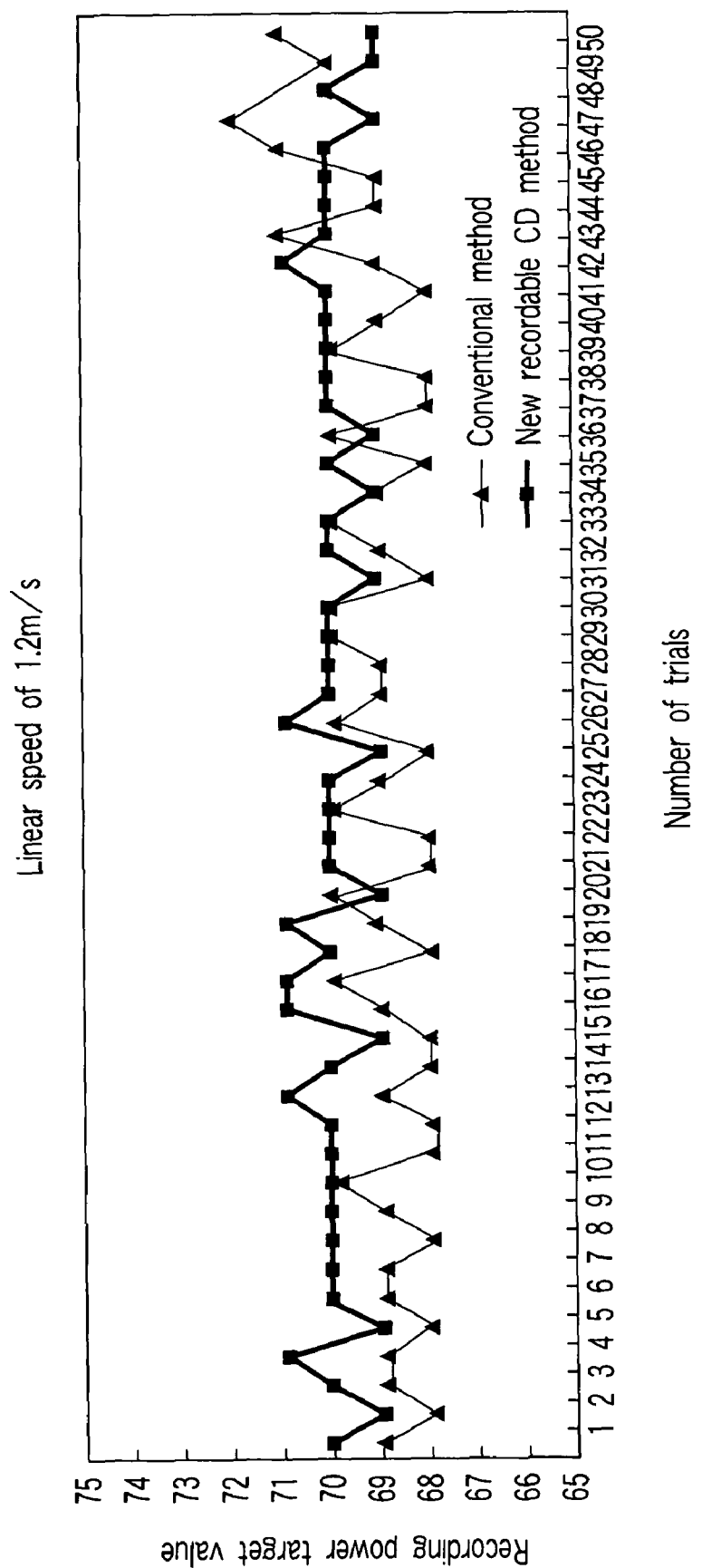
FIG. 16 is a diagram to help explain the result of examining the repeat accuracy of recording power target values obtained from a recording power versus β value approximation characteristic when OPC is made on a recordable CD with a face deflection whose linear speed is 1.2 m/s in a conventional order and in a new order.

FIG. 16 shows the result of examining the repeat accuracy of recording power target values obtained from a recording power versus β value approximation characteristic when OPC was made on a recordable CD with a face deflection (or disc whose outermost edge deflected about 0.5 mm) and a linear speed of 1.2 m/s in a conventional order (FIG. 3) and in a new order (FIG. 5).

Figure 17:
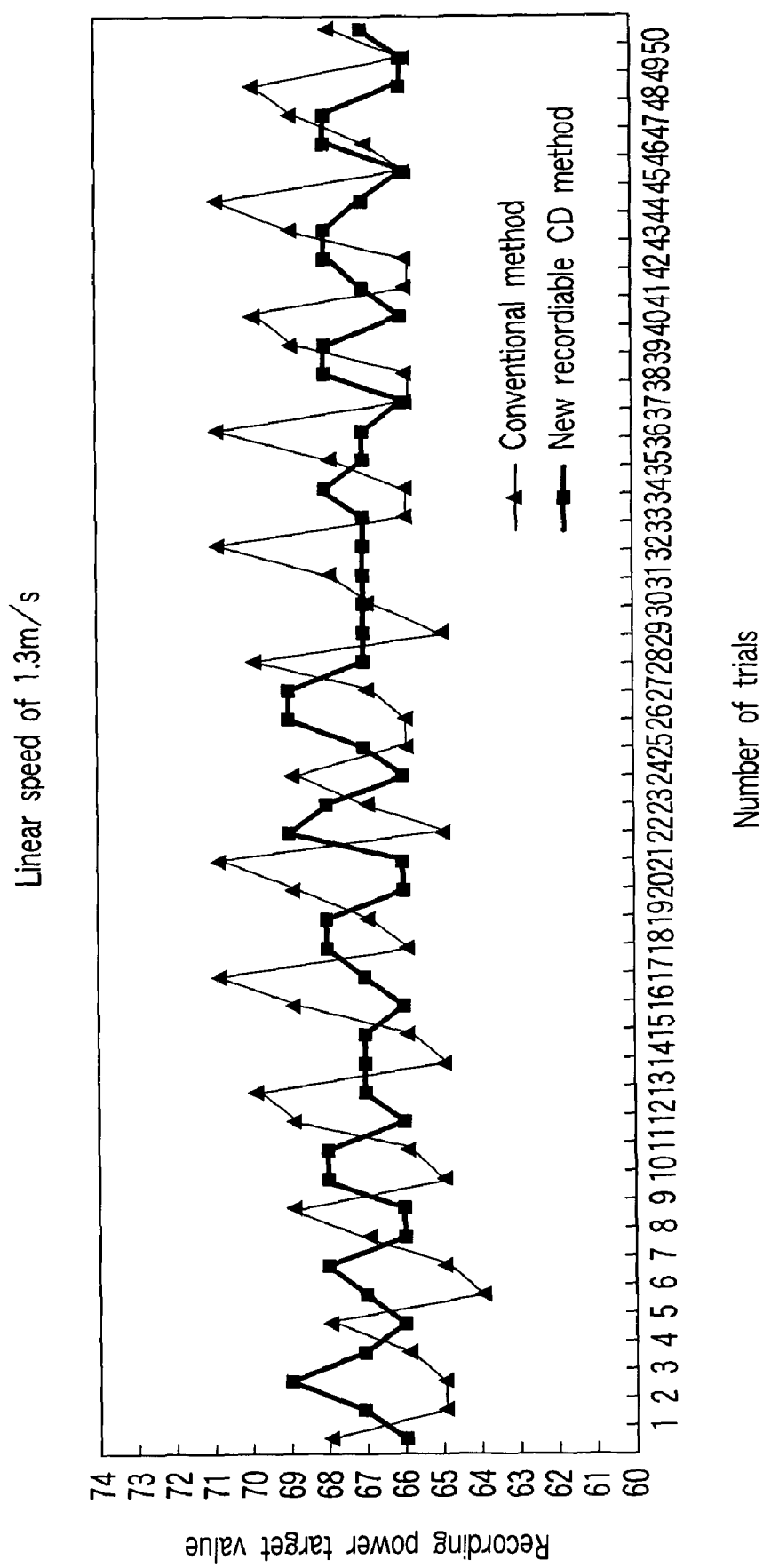
FIG. 17 is a diagram to help explain the result of examining the repeat accuracy of recording power target values obtained from a recording power versus β value approximation characteristic when OPC is made on a recordable CD with a face deflection whose linear speed is 1.3 m/s in a conventional order and in a new order.

FIG. 17 shows the result of examining the repeat accuracy of recording power target values obtained from a recording power versus β value approximation characteristic when OPC was made on a recordable CD with a face deflection (or disc whose outermost edge deflected about 0.5 mm) and a linear speed of 1.3 m/s in a conventional order (FIG. 3) and in a new order (FIG. 5).

Table 2 lists the resulting statistics shown in FIGS. 16 and 17.

TABLE 2

|  | Linear speed | | | |
|---|---|---|---|---|
|  | 1.2 m/s | | 1.3 m/s | |
|  | Conventional Order | New Order | Conventional Order | New Order |
| Average | 69.1 | 69.92 | 67.44 | 67.14 |
| Standard Deviation σ | 0.994885 | 0.60068 | 1.99141 | 0.926041 |
| Error | 1.439776 | 0.859096 | 2.952862 | 1.379268 |

As shown in Table 2, the statistics in the new order show better values than those in the conventional order.

The change of the order of recording power values in OPC shows effects to all of the recording optical discs. Specifically, when a recording power versus asymmetry characteristic is considered in obtaining the optimum recording power, recording is done in such a manner that the recording power is changed so as to cancel the effect of a face deflection or an eccentricity of the disc, taking the linear speed in OPC into account (e.g., considering a case where DVD is used and a case where CD is used), which makes it possible to obtain the optimum recording power with high accuracy even if the recording start position changes according to the degree of the effect of a face deflection or an eccentricity. The same holds true for an optical disc using blue laser.

This invention is not limited to the above embodiment and may be embodied by modifying the component elements without departing from the spirit or essential character thereof. In addition, various inventions may be formed by combining suitably a plurality of component elements disclosed in the embodiment. For example, some ones may be removed from all of the component elements constituting the embodiment. Furthermore, component elements used in two or more embodiments may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording power determining method comprising:
preparing recording power values on the basis of a start power and step power according to a recording speed;
writing data into a plurality of test blocks arranged consecutively on an optical disc while changing a recording power in such a manner that a difference of the two power values applied to adjacent two test blocks of any adjacent pair in the test blocks is twice the step power or larger;
reproducing an information recorded in the test blocks written into consecutively;
determining asymmetry values for each of the recording power values on the basis of the information in each of the test blocks reproduced;
determining an approximation characteristic of the asymmetry values for a recording power on the basis of the asymmetry values for each of the recording power values; and
determining optical power values for realizing a specific target values of the asymmetry values from the obtained approximation characteristic.

2. The recording power determining method according to claim 1, wherein the approximation characteristic is determined through smoothing by a weighted average.

3. An optical disc apparatus comprising:
a storage section which stores a target asymmetry value;
recording power values preparing section which prepares recording power values on the basis of a start power and step power according to a recording speed;
a test writing section which has a test writing circuit for writing data into a plurality of test blocks arranged consecutively on an optical disc while changing a recording power and which writes data in such a manner that difference of the two power values wrote adjacent two test blocks of any adjacent pair in the test blocks is twice the step power or larger;
a reproducing section which reproduces the information recorded in the test blocks written into consecutively;

an asymmetry values computing section which determines an asymmetry values for each of the recording power values on the basis of the information in each of the test blocks reproduced;

an approximation characteristic computing section which determines an approximation characteristic of the asymmetry values for a recording power on the basis of the asymmetry values for each of the recording power values; and an optimal recording power values determining section which determines a recording power for realizing the target asymmetry values stored in the storage section from the obtained approximation characteristic.

4. The optical disc apparatus according to claim 3, wherein the approximation characteristic computing section calculates the approximation characteristic through smoothing by a weighted average.

* * * * *